United States Patent
Zhao et al.

(10) Patent No.: US 10,606,670 B2
(45) Date of Patent: Mar. 31, 2020

(54) SHARED MEMORY USAGE TRACKING ACROSS MULTIPLE PROCESSES

(71) Applicant: EMC IP Holding Company LLC, Hopkinton, MA (US)

(72) Inventors: Junping Zhao, Beijing (CN); Xiangping Chen, Sherborn, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 226 days.

(21) Appl. No.: 15/950,822

(22) Filed: Apr. 11, 2018

(65) Prior Publication Data
US 2019/0317843 A1     Oct. 17, 2019

(51) Int. Cl.
| | |
|---|---|
| *G06F 9/54* | (2006.01) |
| *G06F 13/16* | (2006.01) |
| *G06F 12/1009* | (2016.01) |
| *G06F 11/34* | (2006.01) |
| *G06F 12/1072* | (2016.01) |
| *G06F 9/455* | (2018.01) |

(52) U.S. Cl.
CPC .......... *G06F 9/544* (2013.01); *G06F 11/3466* (2013.01); *G06F 12/1009* (2013.01); *G06F 12/1072* (2013.01); *G06F 13/1663* (2013.01); *G06F 9/45558* (2013.01); *G06F 2009/45583* (2013.01)

(58) Field of Classification Search
CPC .. G06F 9/544; G06F 11/3466; G06F 12/1009; G06F 12/1072; G06F 13/1663; G06F 9/45558; G06F 2009/45583
See application file for complete search history.

(56) References Cited

PUBLICATIONS

"Memory Resource Controller," https://www.kernel.org/doc/Documentation/cgroup-v1/memory.txt, Apr. 2010, 14 pages.
Zhenyun Zhuang, "Don't Let Linux Control Groups Run Uncontrolled," https://engineering.linkedin.com/blog/2016/08/don_t-let-linux-control-groups-uncontrolled, Aug. 18, 2016, 8 pages.
Wikipedia, "cgroups," https://en.wikipedia.org/wiki/Cgroups, Mar. 12, 2018, 5 pages.

*Primary Examiner* — Eric Cardwell
(74) *Attorney, Agent, or Firm* — Ryan, Mason & Lewis, LLP

(57) ABSTRACT

An apparatus in one embodiment comprises a host device that includes at least one processor and an associated memory. The host device is configured to implement a plurality of processes each configured to access a shared region of the memory. The host device is further configured to establish a multi-process control group for the shared region, to maintain state information for the multi-process control group, and to track usage of the shared region by the processes based at least in part on the state information. At least a subset of the processes may comprise respective containers implemented utilizing operating system level virtualization of the processor of the host device. The multi-process control group established for the shared region illustratively comprises a coarse-grained control group having a granularity greater than a single page of the shared region.

20 Claims, 10 Drawing Sheets

SHARED MEMORY USAGE TRACKING ACROSS MULTIPLE PROCESSES

FIELD

The field relates generally to information processing systems, and more particularly to memory control in host devices of such systems.

BACKGROUND

A given host device may be configured to support multiple processes that share access to a common memory. For example, host devices may be configured to utilize operating system level virtualization techniques such as Linux containers with each such container corresponding to a different process. These and other processes of a given host device may share memory for any of a number of different reasons, such as to facilitate implementation of functionality associated with pipelining, fast inter-process communication, resource throttling and many others. In typical conventional practice, a Linux control group ("cgroup") tracks kernel memory usage for shared memory via a page-level "first touch" principal in which the first process that brings a new page into a shared memory region is charged at page-in for that particular page. Any and all charges relating to the particular page are automatically assessed to the first process, even though one or more other processes later map to the shared memory region that includes the page. Such an arrangement fails to accurately reflect actual usage of the shared memory region by the various processes. This can result in some processes being overcharged, and possibly experiencing more frequent crashes due to out-of-memory conditions, while other processes are undercharged or assessed no charges at all.

SUMMARY

Illustrative embodiments provide techniques for shared memory usage tracking across multiple processes running on a host device in an information processing system. For example, some embodiments implement techniques for tracking usage of shared memory across multiple processes on a coarse-grained control group basis in conjunction with a lazy updating process that may be implemented using a background thread. These and other embodiments can provide substantially more accurate and equitable usage tracking across multiple processes, thereby avoiding situations in which individual processes are overcharged or undercharged for their respective usage of a shared memory region, or experience crashes or other types of failures due to out-of-memory conditions. The shared memory usage tracking techniques can be readily deployed in a shared processing environment within cloud infrastructure, such as within a container-based Platform-as-a-Service (PaaS) cloud, as well as in numerous other information processing system environments.

In one embodiment, an apparatus comprises a host device that includes at least one processor and an associated memory. The host device is configured to implement a plurality of processes each configured to access a shared region of the memory. The host device is further configured to establish a multi-process control group for the shared region, to maintain state information for the multi-process control group, and to track usage of the shared region by the processes based at least in part on the state information. At least a subset of the processes may comprise respective containers implemented utilizing operating system level virtualization of the processor of the host device.

The multi-process control group established for the shared region illustratively comprises a coarse-grained control group having a granularity greater than a single page of the shared region. For example, the granularity can be on the order of megabytes (MB), potentially encompassing a large number of pages each on the order of kilobytes (KB).

The host device may be further configured to establish single-process control groups for respective ones of the processes with each such single-process control group being a fine-grained control group having a granularity equivalent to a single page of the shared region.

The multi-process control group illustratively specifies a plurality of characteristics of the shared region including, for example, an allocated size of the shared region, a current paged-in size of the shared region, a current number of processes accessing the shared region, and a plurality of pointers to respective single-process control groups for the processes accessing the shared region.

In some embodiments, the usage tracking comprises assessing usage of the shared region to each of the processes at least in part as a function of the current paged-in size divided by the current number of processes accessing the shared region. Numerous other usage tracking arrangements for even or uneven allocation of usage across the processes accessing the shared region may be used.

The state information maintained for the multi-process control group illustratively comprises a current state selected from a plurality of possible states including at least a first state indicating that usage of the shared memory region has been properly assessed to respective ones of the processes and that no update to the usage tracking is needed, and a second state indicating that there has been at least one change necessitating an update to the usage tracking.

Examples of changes necessitating an update to the usage tracking include an addition of a new process to the processes accessing the shared region, a deletion of an existing process from the processes accessing the shared region, or other types of changes in at least one characteristic of the shared region, such as an addition of a new page to the shared region or a deletion of an existing page from the shared region.

The usage tracking in some embodiments is implemented as a background thread executing on the processor of the host device.

By way of example, the usage tracking may be configured to determine whether or not the multi-process control group is in the second state, and responsive to an affirmative determination that the multi-process control group is in the second state, to calculate new assessments of usage of the shared region for respective ones of the processes, to provide the new assessments to respective single-process control groups of the respective processes, and to change the state of the multi-process control group from the second state to the first state.

These and other illustrative embodiments described herein include, without limitation, methods, apparatus, systems, and computer program products comprising processor-readable storage media.

DETAILED DESCRIPTION

Illustrative embodiments will be described herein with reference to exemplary information processing systems and associated host devices, storage devices and other processing devices. It is to be appreciated, however, that these and other embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center that includes one or more clouds hosting multiple tenants that share cloud resources. Such systems are considered examples of what are more generally referred to herein as cloud computing environments. The term "cloud infrastructure" as used herein is intended to be broadly construed to encompass these and other information processing system environments that include at least a portion of at least one cloud.

Figure 1:
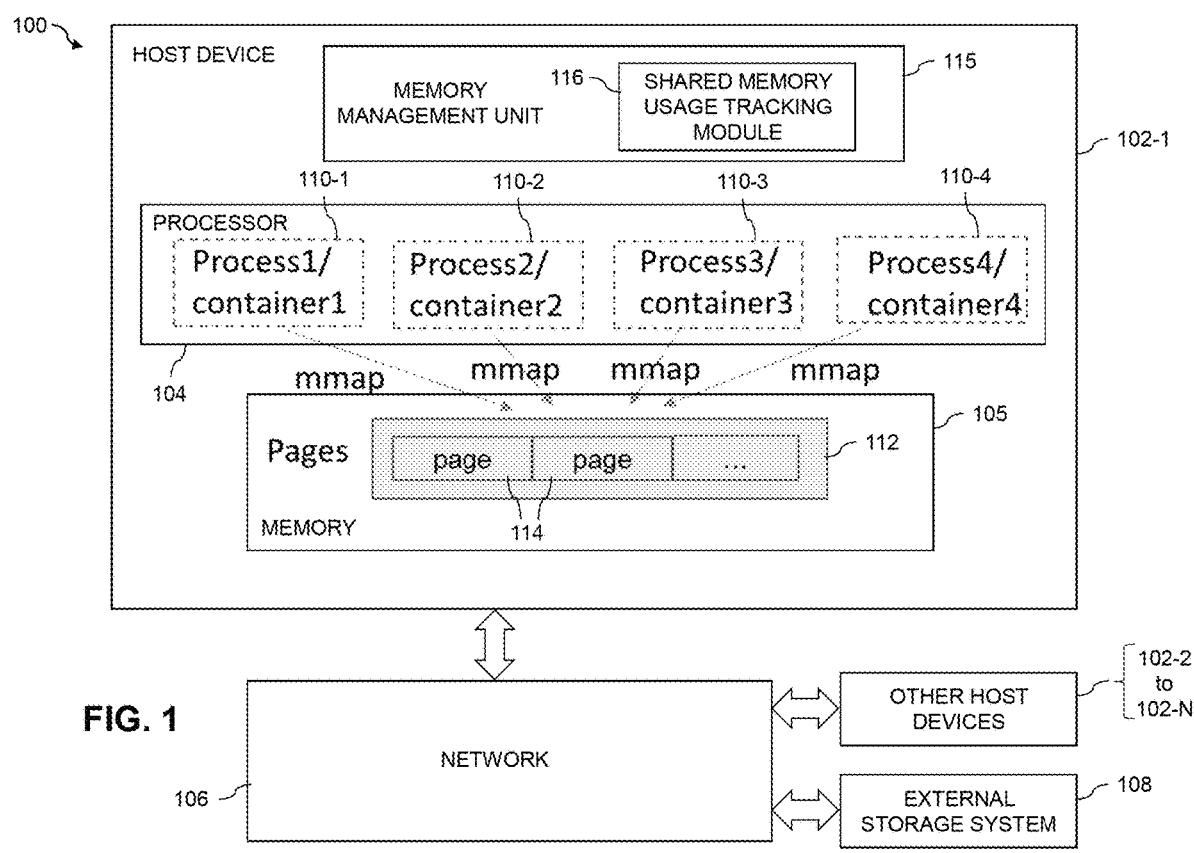
FIG. 1 is a block diagram of an information processing system comprising at least one host device configured for shared memory usage tracking across multiple processes in an illustrative embodiment.

FIG. 1 shows an information processing system 100 configured to implement functionality for shared memory usage tracking across multiple processes. The system 100 comprises a first host device 102-1 comprising a processor 104 and an associated memory 105. The host device 102-1 is configured to communicate over a network 106 with other host devices 102-2 through 102-N and an external storage system 108.

The host device 102-1 is configured to implement a plurality of processes 110-1, 110-2, 110-3 and 110-4, each configured to access a shared region 112 of the memory 105. The shared region 112 comprises a plurality of pages 114. The pages in some embodiments are illustratively of a designated fixed size, such as 4 kilobytes (KB), 8 KB or 16 KB, although other page sizes can be used in other embodiments. Each of the processes 110 executes a memory mapping ("mmap") function to map to one or more of the pages 114 of the shared region 112.

The processes 110 in some embodiments comprise respective containers implemented utilizing operating system level virtualization of the processor 104 of the host device 102-1. The term "process" as used herein is therefore intended to be broadly construed so as to encompass containers as well as other types of processes that may be implemented by the processor 104 in conjunction with execution of one or more applications on behalf of one or more users of the system 100. Terms such as "process/container" as used herein are intended to refer to a container or another type of process.

The host device 102-1 further comprises a memory management unit 115 having a shared memory usage tracking module 116. The shared memory usage tracking module 116 is configured to establish a multi-process control group for the shared region 112, to maintain state information for the multi-process control group, and to track usage of the shared region 112 by the processes 110 based at least in part on the state information.

The multi-process control group established for the shared region 112 illustratively comprises a coarse-grained control group having a granularity greater than a single page of the shared region 112.

The shared memory usage tracking module 116 in some embodiments is also be configured to establish single-process control groups for respective ones of the processes 110. Each such single-process control group illustratively comprises a fine-grained control group having a granularity equivalent to a single one of the pages 114 of the shared region 112. The single-process control group therefore has a granularity on the order of the page size, illustratively 4 KB, 8 KB, 16 KB or other value in the KB range, while the multi-process control group may have a much larger granularity, such as a granularity on the order of megabytes (MB).

The multi-process control group illustratively specifies a plurality of characteristics of the shared region 112 including, for example, an allocated size of the shared region 112, a current paged-in size of the shared region 112, a current number of processes accessing the shared region 112, and a plurality of pointers to respective single-process control groups for the processes 110 accessing the shared region 112.

In some embodiments, the usage tracking comprises assessing usage of the shared region 112 to each of the processes 110 at least in part as a function of the current paged-in size divided by the current number of processes 110 accessing the shared region 112. Numerous other usage tracking arrangements for even or uneven allocation of usage across the processes 110 accessing the shared region 112 may be used.

The state information maintained for the multi-process control group by the shared memory usage tracking module 116 illustratively comprises a current state selected from a plurality of possible states.

An example of a set of possible states for the state information in an illustrative embodiment is as follows:

1. A first state indicating that usage of the shared memory region has been properly assessed to respective ones of the processes and that no update to the usage tracking is needed. This state is also referred to herein as a "clean" state.

2. A second state indicating that there has been at least one change necessitating an update to the usage tracking. This state is also referred to herein as a "dirty" state.

3. A third state indicating that an update to the usage tracking is in progress. This state is also referred to herein as an "update-in-progress" state.

4. A fourth state indicating that an immediate update to the usage tracking is needed. This state is also referred to as an "urgent" state. The urgent state may be indicated if a given process is sufficiently close to reaching its assigned memory quota. For example, the urgent state may be indicated if the process has utilized a predefined threshold amount of its memory quota, such as 90% of its memory quota.

A wide variety of other arrangements of additional or alternative states can be used in tracking usage of shared region 112 by processes 110 in other embodiments.

In some embodiments, a change necessitating an update to the usage tracking comprises an addition of a new process to the processes 110 accessing the shared region 112, a deletion of an existing process from the processes 110 accessing the shared region 112, or another type of change in at least one characteristic of the shared region 112. Such other changes in at least one characteristics of the shared region 112 can include, for example, an addition of a new page to the pages 114 of the shared region 112, or deletion of an existing page from the pages 114 of the shared region 112.

The usage tracking in some embodiments comprises assessing usage of the shared region 112 substantially equally to each of the processes 110 accessing the shared region 112. Alternatively, the usage tracking may comprise assessing usage of the shared region 112 to each of the processes 110 in accordance with actual usage of the shared region 112 by that particular process.

At least a portion of the updates to the access tracking in some embodiments utilize what is referred to herein as a "lazy updating" protocol. For example, in some embodiments, the usage tracking provided by the shared memory usage tracking module 116 of the memory management unit 115 is configured to determine whether or not the multi-process control group is in the second state, and responsive to an affirmative determination that the multi-process control group is in the second state, to calculate new assessments of usage of the shared region for respective ones of the processes, to provide the new assessments to respective single-process control groups of the respective processes, and to change the state of the multi-process control group from the second state to the first state.

The shared memory usage tracking module 116 can implement these and other operations at least in part in the form of one or more background threads executing on the processor 104 of the host device 102-1.

It should be noted that functionality described herein as being performed by the memory management unit 115 or the shared memory usage tracking module 116 can in other embodiments be performed at least in part by other portions of the host device 102-1 or by other components of the system 100. Also, components such as shared memory usage tracking module 116 can be implemented at least in part in the form of software that is stored in a program storage portion of memory 105 and executed by the processor 104.

The host device 102-1 in some embodiments may comprise one or more virtual machines controlled by a hypervisor of a processing platform, although a wide variety of other types of host devices may be used.

The host device 102-1 in some embodiments is more particularly implemented as a container host device. The host device 102-1 and the additional host devices 102-2 through 102-N, collectively referred to herein as host devices 102, are examples of what are more generally referred to herein as "processing devices" of the one or more processing platforms of the system 100. Each such processing device of a given processing platform comprises at least one processor coupled to a memory.

It is assumed in this embodiment that each of the other host devices 102-2 through 102-N is configured in a manner similar to host device 102-1 as described above and illustrated in the figure.

The system 100 in some embodiments comprises a plurality of compute nodes with each such compute node comprising one or more of the host devices 102. The compute nodes can be implemented on respective separate processing platforms. Alternatively, different compute nodes can be implemented on respective different processing platforms coupled together via the network 106.

The compute nodes may comprise respective compute nodes of cloud infrastructure, such as an Amazon Web Services (AWS) system. Other examples of cloud-based systems that can be used to implement compute nodes and their respective host devices and possibly other portions of system 100 include Google Cloud Platform (GCP) and Microsoft Azure. The compute nodes may be implemented on a per-tenant basis and extend in a distributed manner across host devices of multiple public, private or hybrid clouds.

A given such cloud can comprise a Platform-as-a-Service (PaaS) layer overlying an Infrastructure-as-a-Service (IaaS) layer. The IaaS layer may comprise a plurality of virtual machines supporting application containers of the PaaS layer. For example, host devices in such an embodiment illustratively correspond to respective ones of the virtual machines of the IaaS layer.

It should be noted that the description above and elsewhere herein relating to host devices 102 should not be viewed as limiting in any way. Other embodiments can utilize other types of host devices 102, including "bare metal" hosts. The term "host device" as used herein is therefore intended to be broadly construed.

The host devices 102 in the present embodiment each access the external storage system 108 over network 106. For example, the host devices 102 may be configured to access the external storage system 108 using respective storage drivers implemented in those host devices 102. Such drivers can include block-based storage drivers such as DeviceMapper ("DM") or file-based storage drivers such as Advanced multi-layered Unification File System (AUFS). Other alternative drivers include ZFS storage drivers, and many others. Combinations of multiple such distinct drivers can also be used. The processes 110 may be coupled via respective IO data paths to external bind volumes in the external storage system 108. Such external storage arrangements are illustratively implemented via corresponding Docker volume plugin modules such as REX-Ray from Dell EMC.

The external storage system 108 may be configured to provide data services for processes 110 of the host devices 102. A given one of the processes 110 or a set of such processes 110 may be associated with a particular tenant of the system 100. Different storage volumes or other portions of the external storage system 108 are illustratively allocated to respective ones of the processes 110.

Examples of data services that may be provided for processes 110 by the external storage system 108 include data caching services, storage tiering services, data deduplication services, networking services and data security services. Numerous other types of data services may additionally or alternatively be implemented for particular processes 110. Some of the data services may run at least in part in the corresponding host devices. For example, caching services may involve one or more caches of respective host devices. As another example, tiering hints for a storage tiering service can be generated in the host devices. As a further example, one or more deduplication domains for a deduplication service may be in one of the host devices 102 rather than in the external storage system 108.

As indicated above, the processes 110 are illustratively configured for executing at least portions of one or more applications on behalf of one or more tenants of cloud infrastructure of the system 100. Such cloud infrastructure of system 100 illustratively comprises the host devices 102 and the external storage system 108. Different ones of the processes 110 may be associated with different tenants. Alternatively, multiple ones of the processes 110 may be associated with a single one of the tenants.

The processes 110 in some embodiments comprise respective jobs within a larger application task such as a task associated with MPI, MapReduce, Spark or other processing frameworks. Accurate usage tracking is needed in these and other contexts for resource throttling, resource allocation or other actions that may be taken in the host device 102-1 to optimize performance over the multiple processes 110. For example, resource quotas assigned to respective ones of the processes 110 may be adjusted based at least in part on results provided by tracking usage of the shared region 112. Such resource quotas illustratively comprise respective quotas for amounts of the shared region 112 or memory 105 that are utilizable by respective ones of the processes 110.

In the FIG. 1 embodiment, it is assumed that the processes 110 allocate portions of the shared region 112 for their use via a common memory sharing mechanism, illustratively a POSIX memory map ("mmap") function. Other memory sharing mechanisms can be used, such as SystemV shmget/attach interfaces.

Such memory sharing may be used to avoid duplicate data loading. For example, a file or common library may be loaded once from the external storage system 108 into the shared region 112 of the memory 105, and then shared across the processes 110. The data in some cases comprises read-only data. Additionally or alternatively, the data may comprise writeable data, in which case copy-on-write (COW) mechanisms may be used in conjunction with processing of the shared data.

The memory sharing can also be used to facilitate inter-process communication (IPC) functionality in the host device 102-1. For example, in some embodiments, a particular one of the processes 110 initially creates a mmap handle, and then the other processes 110 would mmap the same area for data exchange. Application tasks associated with processing frameworks such as MPI, MapReduce, Spark and many others may involve launching multiple worker processes via mmap IPC.

One or more of the processes 110 may additionally obtain exclusive access to other portions of the memory 105 outside of the shared region 112.

As indicated previously, Linux control groups are generally configured to track kernel memory usage for shared memory via a page-level "first touch" principal in which the first process that brings a new page into a shared memory region is charged at page-in for that particular page. Any and all charges relating to the particular page are automatically assessed to the first process, even though one or more other processes later map to the shared memory region that includes the page. Such an arrangement fails to accurately reflect actual usage of the shared memory region by the various processes. This can result in some processes being overcharged, and possibly experiencing more frequent crashes due to out-of-memory conditions, while other processes are undercharged or assessed no charges at all.

Figure 2:
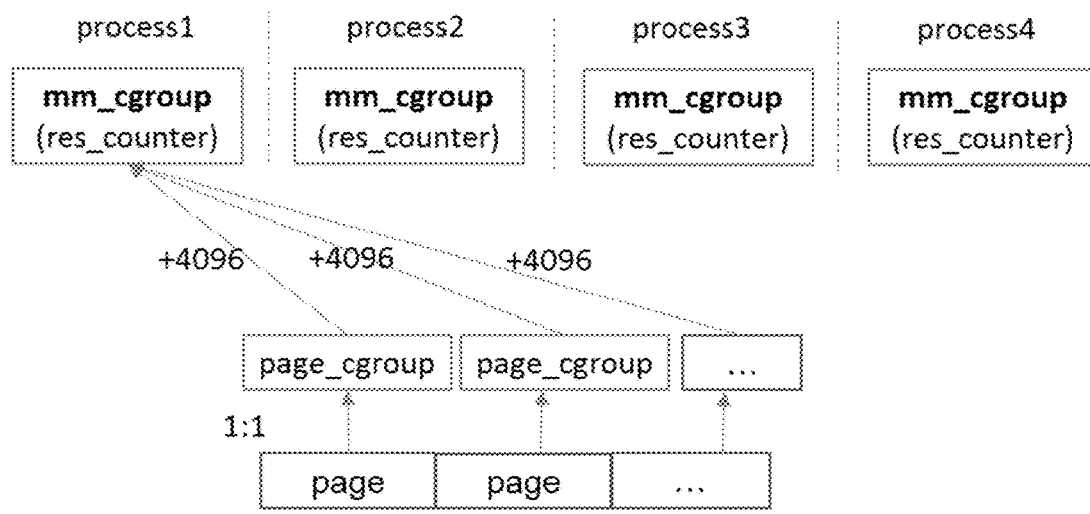
FIG. 2 illustrates a shared memory usage tracking arrangement in which a first one of a plurality of processes of a host device is assessed all charges for particular pages.

FIG. 2 illustrates a shared memory usage tracking arrangement 200 in which a first one of the processes 110 is assessed all charges for the shared pages of the shared region 112. In this example arrangement, memory usage is tracked at a fine-grained level corresponding to a single page. Each page maps on a 1:1 basis to a corresponding memory accounting structure denoted page_cgroup. The page size in this example is 4 KB or 4096 bytes, and it is assumed that the shared region 112 comprises 8000 pages, for a total shared memory size of 32 MB. Each of the processes 110 includes a single-process control group denoted mm_cgroup that maintains a corresponding counter res_counter.

Further assuming that the first one of the processes 110 ("process1") initially brings the 8000 pages into the shared region 112 of the memory 105, the counter of process1 is updated to assess the entire usage of the shared region 112 to that process at page-in. The other processes 110 in the arrangement 200 later execute mmap functions to the shared region 112 but are not charged, even though those other processes may intensively read and/or write the shared pages. The first process in this arrangement is overcharged, and may even experience crashes or other failures as a result of exceeding its established memory quota and producing an out-of-memory condition.

These and other similar issues are overcome in illustrative embodiments through the implementation of the shared memory usage tracking functionality implemented by module 116 of the host device 102-1. As noted above, such embodiments provide more accurate and efficient shared memory usage tracking at least in part through the establishment of a coarse-grained control group across the multiple processes, which in conjunction with a lazy updating process can significantly improve performance and scalability.

Additional details of illustrative embodiments will now be described with reference to FIGS. 3 through 8. Although mmap functionality is used for memory mapping in these embodiments, other embodiments can utilize other types of memory mapping techniques, including the above-noted SystemV shmget/attach interfaces.

Figure 3:
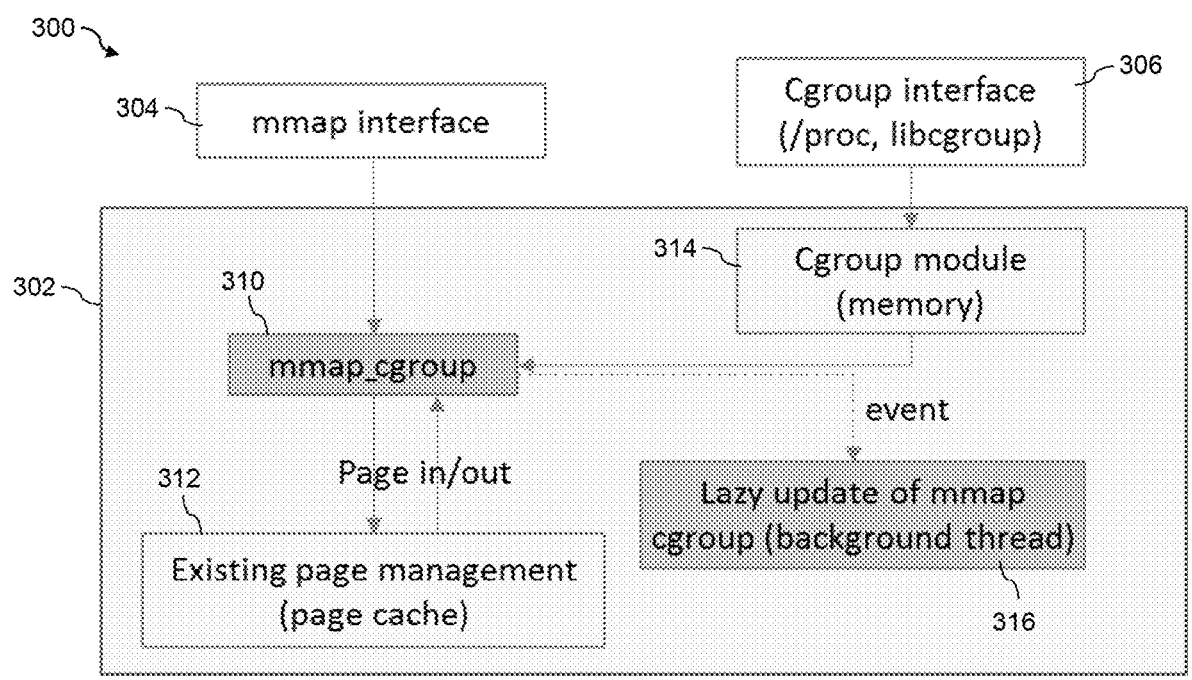
FIG. 3 is a block diagram of a portion of a host device showing components of a shared memory usage tracking module in an illustrative embodiment.

Referring now to FIG. 3, a portion 300 of the host device 102-1 is shown. The portion 300 may be viewed as one possible implementation of the memory management unit 115 and its shared memory usage tracking module 116. The portion 300 more particularly comprises a memory management unit 302 coupled to mmap interface 304 and cgroup interface 306, the latter illustratively including/proc and libcgroup interfaces. The memory management unit 302 comprises a mmap_cgroup 310, a page management module 312 illustratively comprising a page cache, a cgroup module 314 associated with the memory 105, and a lazy updating process 316 configured to update the mmap_cgroup 310 responsive to designated events and implemented as a background thread.

The mmap_cgroup 310 is an example of what is more generally referred to herein as a "multi-process control group" established for the shared region 112. Such a multi-process control group in the present embodiment is more particularly referred to as a "coarse-grained control group" as it has a granularity greater than a single page of the shared region. For example, the granularity can be on the order of MB, potentially encompassing a large number of pages each on the order of KB.

In the FIG. 3 embodiment, the host device 102-1 is configured to distribute assessment of usage of the shared region 112 of memory 105 across all of the processes 110 that memory map to that shared region 112. For example, in the arrangement described above in conjunction with FIG. 2, in which the shared region 112 comprises 8000 pages each of size 4 KB for a total shared region size of 32 MB, the shared memory usage tracking functionality of the memory management unit 302 is illustratively configured to charge each of the four processes 110-1, 110-2, 110-3 and 110-4, also denoted process1, process2, process3 and process4, respectively, for 8 MB of the shared region 112 of the memory 105. Such an arrangement is an example of shared memory usage tracking in which usage of the shared region 112 is assessed substantially equally to each of the processes 110 accessing the shared region 112, where such access is illustratively via their respective mmap functions. In other embodiments, the usage tracking may instead comprise assessing usage of the shared region 112 to the processes 110 in accordance with actual usage of the shared region 112 by the processes 110.

The memory management unit 302 via its lazy updating process 316 is configured to update the usage tracking via a background thread, responsive to events that include changes in monitored state information of the mmap_cgroup 310 from a "clean" state to a "dirty" state. A more detailed example of the lazy updating process 316 will be described below in conjunction with the flow diagram of FIG. 5.

The memory management unit 302 may be further configured to update shared memory usage "on the fly" in the case of respective memory map ("mmap") or memory unmap ("munmap") operations executed by one or more of the processes 110 in the host device 102-1, illustratively using the respective techniques to be described below in conjunction with the flow diagrams of FIGS. 6 and 7.

Such functionality of the memory management unit 302 also leverages additional host device infrastructure, including the existing page management module 312 and its page cache, as well as interfaces such as the mmap interface 304 and the cgroup interface 306.

For example, a given one of the processes 110 can call the mmap interface 304 to create a new mmap to a specific portion of a shared region comprising one or more pages, utilizing a go to mmap system call.

The coarse-grained mmap_cgroup 310 in this embodiment is utilized to track the actual usage of the shared region 112 among the processes 110. This single structure is utilized to track usage of the entire shared region 112, regardless of whether the size of the shared region is 8 MB or 800 MB. Accordingly, it is a highly efficient structure in terms of memory overhead and scalability.

Figure 4:
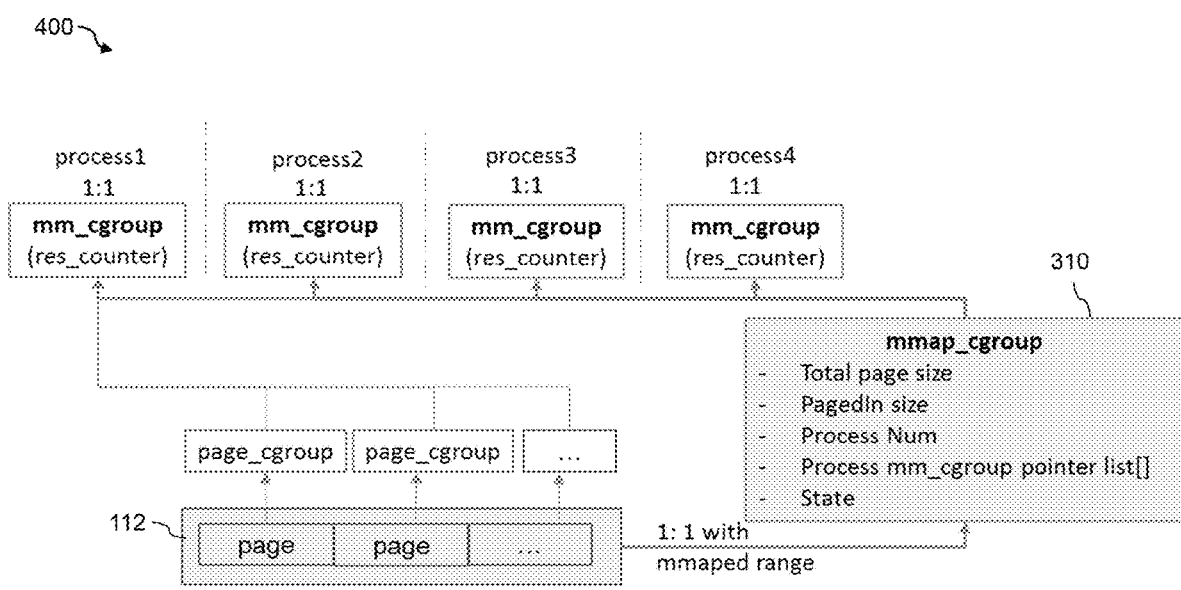
FIG. 4 shows aspects of the operation of a shared memory tracking module of a host device in an illustrative embodiment.

FIG. 4 illustrates additional aspects of the shared memory usage tracking provided by the coarse-grained mmap_cgroup 310 of memory management unit 302 in host device 102-1. Each of the four processes 110 in a portion 400 of host device 102-1 in this embodiment, also denoted as process1, process2, process3 and process4, respectively, is associated on a 1:1 basis with its corresponding fine-grained single-process control group mm_cgroup and counter res_counter, both of the type previously described in conjunction with FIG. 2.

As shown in FIG. 4, the coarse-grained mmap_cgroup 310 in this embodiment specifies various characteristics of the shared region 112 including an allocated size ("total page size") of the shared region 112, a current paged-in size of the shared region 112, a current number of processes 110 accessing the shared region 112, a list of pointers, denoted as process mm_cgroup pointer list, to respective single-process control groups for the processes 110 accessing the shared region 112, and state information including a current state selected from multiple possible states of the type previously described.

The total page size may be specified in terms of a number of pages, but can easily be converted to bytes by simply multiplying the number of pages by the fixed number of bytes per page.

The paged-in size is maintained as it is possible that pages may not be immediately paged in upon execution of the mmap operation. For example, a madvise setting may be used that causes paging in only upon first access. As will be described in more detail below, the paged-in size is used in this embodiment to evenly distribute shared memory usage assessments across the multiple processes 110.

In this embodiment, it is further assumed that the processes 110 utilize file-based shared memory functionality, illustratively implemented in the form of /dev/shm with a unique file handle, rather than anonymous shared memory functionality. Also, although each of the processes 110 are illustratively configured to perform mmap operations to the shared region 112 using the same mapping size, other embodiments can be implement mmap operations using different mapping sizes for different ones of the processes 110.

The multiple possible states from which the current state is selected in this embodiment are assumed to include the first, second, third and fourth states described above, also referred to as clean, dirty, update-in-progress and urgent states, respectively. Again, other arrangements of additional or alternative states can be used in tracking usage of shared region 112 by processes 110 in other embodiments.

FIGS. 5 through 8 are flow diagrams showing respective example techniques implemented in conjunction with shared memory usage tracking in illustrative embodiments.

Figure 5:
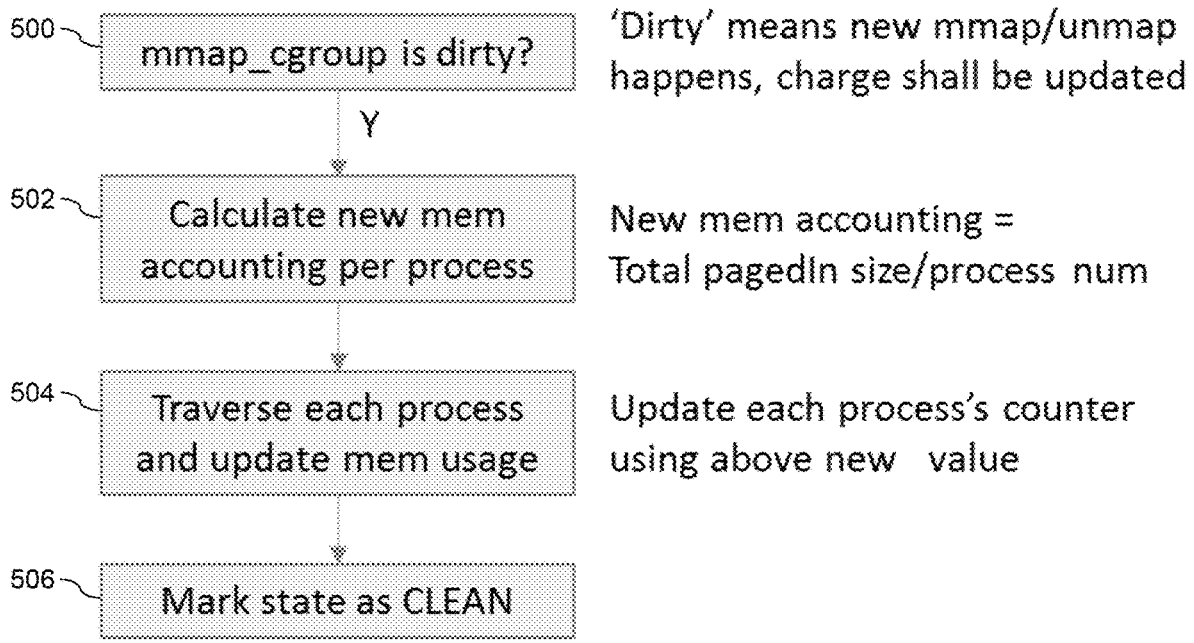
FIGS. 5 through 8 are flow diagrams showing respective example techniques implemented in conjunction with shared memory usage tracking in illustrative embodiments.

Referring now to FIG. 5, the flow diagram for an example implementation of the lazy updating process includes steps 500 through 506. These steps are illustratively performed by a background thread running on the host device 102-1.

In step 500, the lazy updating process determines whether or not the coarse-grained mmap_cgroup 310 is in the dirty state. Responsive to an affirmative determination, the lazy updating process moves to step 502, and otherwise remains in step 500 until the coarse-grained mmap_cgroup 310 is in the dirty state.

In step 502, the lazy updating process calculates new assessments of usage of the shared region 112 for respective ones of the processes 110. This is referred to in the present embodiment as a new memory "accounting" per process. By way of example, the usage tracking in this embodiment comprises assessing usage of the shared region 112 to each of the processes 110 as a function of the current paged-in size divided by the current number of processes 110 accessing the shared region 112. Thus, the new memory accounting is specified in the figure as involving the calculation of the total paged-in size divided by the number of processes 110 accessing the shared region 112. This is an example of an even accounting distribution across the multiple processes accessing the shared region 112. As mentioned previously, other embodiments can use other types of shared memory usage tracking across the multiple processes, including non-even accounting distributions based on actual use, access frequency or other similar factors, alone or in combination.

In step 504, the new assessments are provided to respective single-process mm_cgroups of the respective processes 110. This illustratively involves traversing each process 110 and updating its memory usage by updating the res_counter of each mm_cgroup using the new assessment value previously computed in step 502.

In step 506, the lazy updating process changes the current state of the mmap_cgroup 310 from dirty back to clean as indicated.

Examples of conditions that can cause a change in the current state of the mmap_cgroup 310 from clean to dirty illustratively include an addition of a new process to the processes 110 accessing the shared region 112, deletion of an existing process from the processes 110 accessing the shared region 112, or another type of change in at least one characteristic of the shared region 112, such as addition of a new page to the pages of the shared region 112 or deletion of an existing page from the pages of the shared region 112.

The lazy updating process illustrated in the flow diagram of FIG. 5 therefore operates asynchronously in the present embodiment, and is executed responsive to occurrence of one or more conditions of the type noted above. Such an arrangement can be used to minimize latency overhead, particularly when large numbers of processes 110 are accessing the shared region 112. Additionally or alternatively, the lazy updating process can be configured to periodically scan the mmap_cgroup 310 for any changes to the processes 110 or the shared region 112. The lazy updating process is the default updating process absent entry of the mmap_cgroup 310 into the urgent state.

Figure 6:
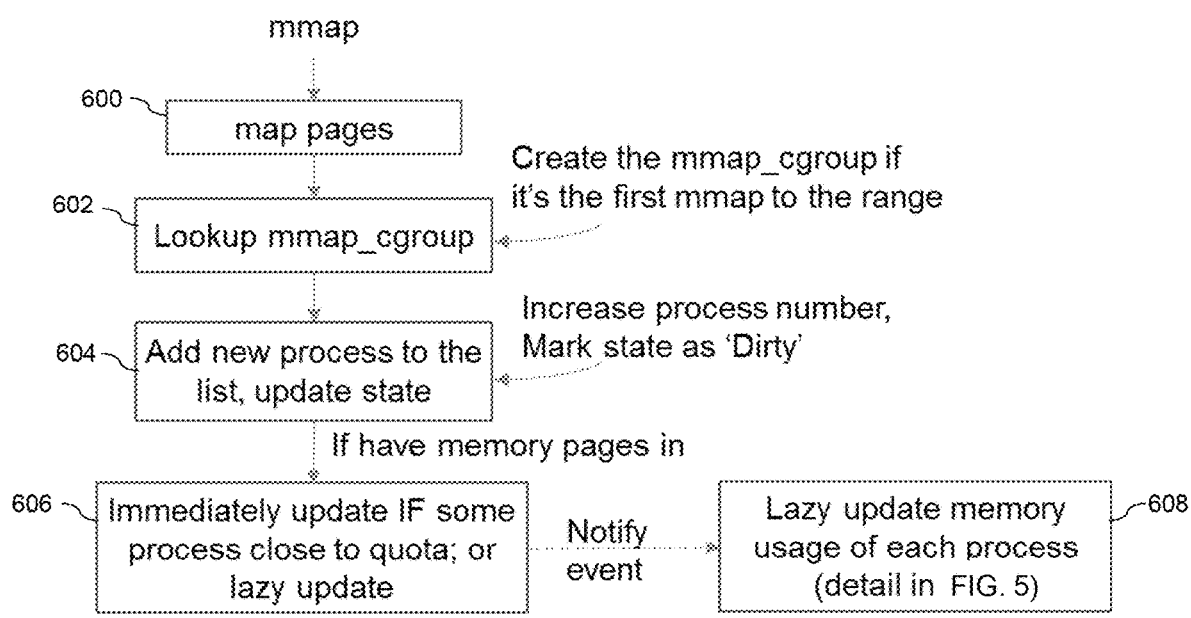

FIG. 6 shows a flow diagram of example steps 600 through 608 performed responsive to a memory map ("mmap") operation in the host device 102-1. The mmap operation is illustratively executed by one of the processes 110 and is directed to the shared region 112.

In step 600, one or more pages are mapped to the shared region 112 in accordance with the mmap operation.

In step 602, the coarse-grained mmap_cgroup 310 is looked up for the process that executed the mmap operation. If this is the first process to map to the range associated with the shared region 112, the mmap_cgroup 310 is created.

In step 604, if the process executing the mmap operation is a new process, it is added to the process list for the mmap_cgroup 310 and the number of processes 110 accessing the shared region 112 is increased by one. The current state of the mmap_cgroup 310 is marked as dirty.

In step 606, if there are memory pages in the shared region, an immediate usage tracking update is performed if any process is sufficiently close to its quota. Otherwise, the flow proceeds to step 608 by notification of an event.

In step 608, the lazy updating process of FIG. 5 is performed in order to update the usage of each of the processes associated with the mmap_cgroup 310.

Figure 7:
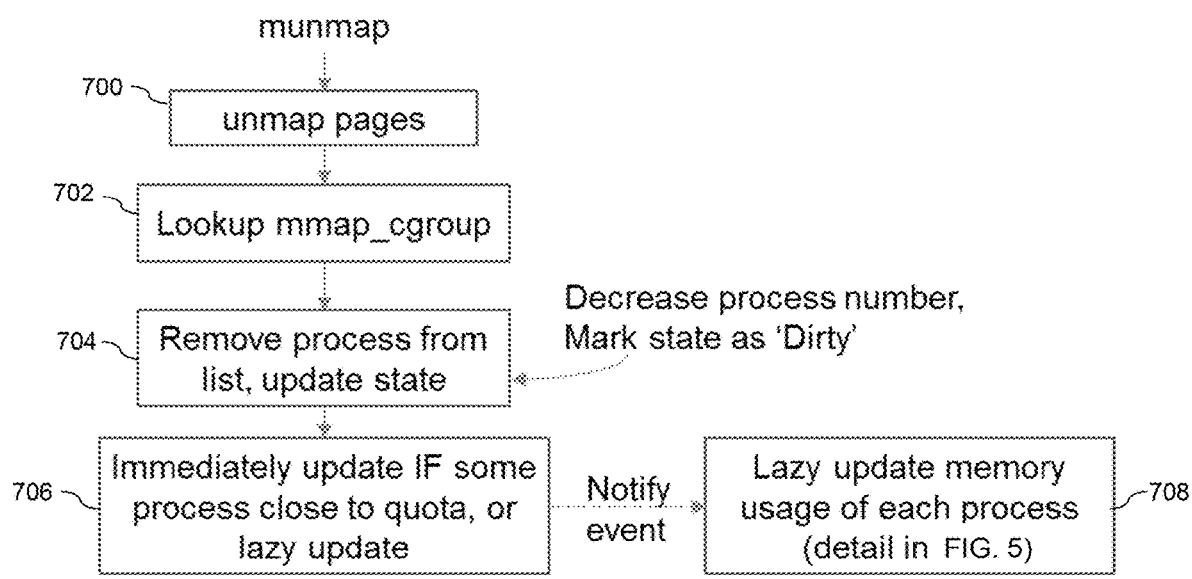

FIG. 7 shows a flow diagram of example steps 700 through 708 performed responsive to a memory unmap ("munmap") operation. The munmap operation is illustratively executed by one of the processes 110 and is directed to the shared region 112.

In step 700, one or more pages are unmapped from the shared region 112 in accordance with the munmap operation.

In step 702, the coarse-grained mmap_cgroup 310 is looked up for the process that executed the munmap operation.

In step 704, the process executing the munmap operation is removed from the process list for the mmap_cgroup 310 and the number of processes 110 accessing the shared region 112 is decreased by one. The current state of the mmap_cgroup 310 is marked as dirty.

In step 706, if there are memory pages in the shared region, an immediate usage tracking update is performed if any process is sufficiently close to its quota. Otherwise, the flow proceeds to step 708 by notification of an event.

In step 708, the lazy updating process of FIG. 5 is performed in order to update the usage of each of the processes associated with the mmap_cgroup 310.

Figure 8:
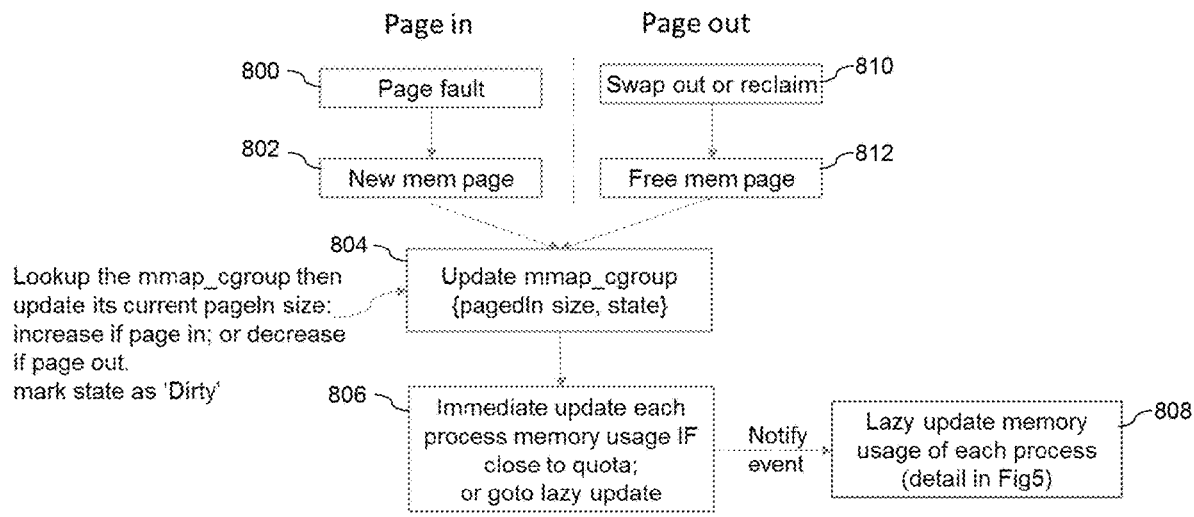

FIG. 8 illustrates the processing performed responsive to changes in the shared region 112 due to page in or page out operations.

For a page in operation, step 800 indicates a page fault, and step 802 obtains a new memory page.

In step 804, the mmap_cgroup 310 is first looked up and is then updated by adjusting its paged-in size and changing its state to dirty. The paged-in size is increased for the page in operation, but would be decreased in the case of a page out operation.

In step 806, an immediate usage tracking update is performed if any process is sufficiently close to its quota. Otherwise, the flow proceeds to step 708 by notification of an event.

In step 808, the lazy updating process of FIG. 5 is performed in order to update the usage of each of the processes associated with the mmap_cgroup 310.

For a page out operation, step 810 indicates a swap out or reclaim of a memory page, and step 812 frees the memory page. Steps 804, 806 and 808 are then performed as indicated, similarly to their performance for the page in operation.

The particular steps shown in the flow diagrams of FIGS. 5 through 8 are presented by way of illustrative example only, and can be varied in other embodiments.

The above-described functionality for shared memory usage tracking across multiple processes in this embodiment may be implemented at least in part in the form of one or more background threads and other types of software executed by the host device 102-1. Again, the other host devices 102-2 through 102-N are assumed to be implemented in substantially the same manner as described above for host device 102-1. Thus, each of the host devices 102 can track usage of a shared region of a memory by multiple processes implemented on that particular host device.

As indicated previously, at least portions of the information processing system 100 are implemented in cloud infrastructure. The cloud infrastructure of the system 100 can comprise a public cloud, a private cloud or a hybrid cloud or an associated data center or other type of system implemented on one or more processing platforms. The term "cloud" as used herein is intended to be broadly construed so as to encompass, for example, combinations of multiple clouds of different types.

For example, cloud native applications can execute in respective application containers implemented utilizing the host devices 102. The host devices 102 may implement Docker containers, LXD containers, Cloud Foundry Diego-based containers or other types of containers. The data required for execution of the cloud native applications is obtained from the external storage system 108.

The external storage system 108 can comprise any of a variety of different types of storage including network-attached storage (NAS), storage area networks (SANs), direct-attached storage (DAS), distributed DAS and software-defined storage (SDS), as well as combinations of these and other storage types. The storage platforms can be configured to provide storage for data of multiple distinct types, including blocks, objects and files.

By way of example, the external storage system 108 of system 100 in some embodiments comprises at least one of network file system (NFS) SAN-based storage and cloud-based storage.

Cloud-based storage of external storage system 108 may comprise at least one object store implemented using cloud storage such as Elastic Cloud Storage (ECS) from Dell EMC. Other examples of object stores that can be utilized to provide at least a portion of external storage system 108 in some embodiments include Amazon Simple Storage Service (S3), GCP Cloud Storage, and Microsoft Azure Blob Storage.

In some embodiments, the external storage system 108 is implemented as a multi-tier storage system comprising at least a fast tier and a capacity tier. The fast tier illustratively comprises non-volatile electronic memory and the capacity tier comprises at least one object store. Tiering hints from applications running in the containers may be used to control movement of data between the fast and capacity tiers.

The example storage system configurations described above may be part of the same processing platform or platforms that also implement cloud infrastructure used to provide at least a subset of the host devices 102.

Containers implemented in the system 100 can utilize COW techniques to provide point-in-time logical views of the data from external storage system 108 that is processed by those containers.

For example, COW allows multiple containers to share access to data stored in the external storage system 108. If an application process in a given one of the containers needs to modify a file, block, object or other item of shared data, a separate local copy of that data item is generated on which the given container can make its modifications, while the original shared data item visible to other ones of the containers remains unchanged. These and other COW techniques typically store the resulting multiple copies in the form of layers in which each layer stores only the modifications relative to one or more other layers.

A given running container on one of the host devices 102 of the system 100 is launched utilizing one or more container images. The container images are illustratively part of a layer structure that includes multiple RO layers associated with respective container images and multiple RW layers associated with multiple running containers that utilize those container images. The RO layers comprise static container images and the RW layers comprise running container instances based on container images that are loaded into memory. The layer structure is in the form of a tree-like hierarchy, with parent-child relationships between the container images of the various layers. Other types of layer structures can be used in other embodiments.

The container images of the respective RO layers in the Docker context include respective differential or "delta" layers each created in conjunction with a corresponding COW operation. A given running container is part of an RW layer and is created utilizing a container image of an immediately overlying RO layer which is itself related back through the layer structure to a base RO layer via one or more intermediate RO layers. Multiple related RO layers of the layer structure therefore collectively provide the single container image that is utilized to generate the given running container.

As mentioned previously, container implementations of processes 110 can be integrated into a PaaS platform such as Cloud Foundry.

In some embodiments, functionality for shared memory usage tracking across multiple processes is integrated with existing system functionality. For example, the disclosed techniques can be integrated with existing container management technologies such as SWARM and Kubernetes.

In addition, the disclosed functionality for shared memory usage tracking across multiple processes can be utilized with a wide variety of different types of storage systems, including storage systems comprising ScaleIO™ software-defined storage and/or Isilon® platform nodes, both from Dell EMC.

For example, a given multi-tier storage system referred to herein can include a fast tier implemented at least in part using ScaleIO™ software-defined storage and a capacity tier implemented at least in part utilizing a scale-out NAS cluster comprising Isilon® platform nodes. Both ScaleIO™ and Isilon® support Docker volume plug-ins using REX-Ray. Numerous other storage systems can be used in other embodiments.

Accordingly, illustrative embodiments can be implemented at least in part utilizing an extended engine plugin configured to support functionality for shared memory usage tracking across multiple processes as disclosed herein. Such an extended engine plugin can be configured to operate in conjunction with existing COW infrastructure such as a Docker engines backed by COW DeviceMapper and AUFS storage drivers. Other snapshot frameworks can be used in other embodiments.

Functionality for shared memory usage tracking across multiple processes such as that described above in conjunction with illustrative embodiments can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

It should be noted that the particular arrangements illustrated in FIGS. 1 through 8 are presented by way of illustrative example only, and should not be construed as limiting in any way. As noted above, the described functionality for shared memory usage tracking across multiple processes can be implemented using additional or alternative components. Accordingly, a wide variety of different shared memory usage tracking arrangements can be used in other embodiments.

The illustrative embodiments described above provide significant advantages over conventional arrangements.

For example, some embodiments implement techniques for tracking usage of shared memory across multiple processes on a coarse-grained control group basis in conjunction with a lazy updating process that may be implemented using a background thread. The disclosed techniques can also accommodate updates based on addition or deletion of pages to or from a shared region of a memory, as well as urgent updates responsive to situations such as a given process nearing a memory quota.

In some embodiments, charges for usage of a shared memory are allocated in an equitable manner based on a desired distribution across the processes, rather than charging only the first process. Moreover, the assessment of charges for shared memory based on a coarse-grained control group significantly reduces the overhead footprint of the usage tracking, thereby facilitating scalability to large numbers of processes as well as shared memories comprising large numbers of pages.

The shared memory usage tracking functionality in some embodiments is implemented in the form of an add-on module that leverages existing interfaces and associated memory management infrastructure of a host device.

These and other embodiments can provide substantially more accurate and equitable usage tracking across multiple processes, thereby avoiding situations in which individual processes are overcharged or undercharged for their respective usage of a shared memory region, or experience crashes or other types of failures due to out-of-memory conditions.

The shared memory usage tracking techniques can be readily deployed in a shared processing environment within cloud infrastructure, such as within a container-based PaaS cloud, as well as in numerous other information processing system environments.

It is to be appreciated that the particular advantages described above and elsewhere herein are associated with particular illustrative embodiments and need not be present in other embodiments.

Also, the particular types of information processing system features and functionality as illustrated in the drawings and described above are exemplary only, and numerous alternative arrangements may be used in other embodiments.

The information processing systems disclosed herein are illustratively implemented using one or more processing platforms, examples of which will be now be described in greater detail. A given such processing platform comprises at least one processing device comprising a processor coupled to a memory.

As mentioned previously, portions of an information processing system as disclosed herein illustratively comprise cloud infrastructure. The cloud infrastructure in some embodiments comprises a plurality of containers implemented using container host devices and may additionally or alternatively comprise other types of virtual resources such as virtual machines implemented using a hypervisor. Such cloud infrastructure can therefore be used to provide what is also referred to herein as a cloud computing environment. A given cloud computing environment may but need not accommodate multiple tenants.

The cloud infrastructure mentioned above may represent at least a portion of one processing platform. Another example of such a processing platform is a plurality of processing devices which communicate with one another over a network. Each such processing device comprises at least one processor coupled to at least one memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as host devices and their corresponding programs, or portions thereof, are illustratively implemented for use by respective tenants of such a multi-tenant environment.

As mentioned previously, cloud infrastructure as disclosed herein can include cloud-based systems such as AWS, GCP and Microsoft Azure. Virtual machines provided in such systems can be used to implement containers that are grouped based on layer structures and possibly other parameters for purposes of container management and data services in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of LXC. The containers may run on virtual machines in a multi-tenant environment, although other arrangements are possible. The containers may be utilized to implement a variety of different types of functionality within the system 100. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 9 and 10. Although described in the context of system 100, these platforms may also be used to implement at least portions of other information processing systems in other embodiments.

Figure 9:
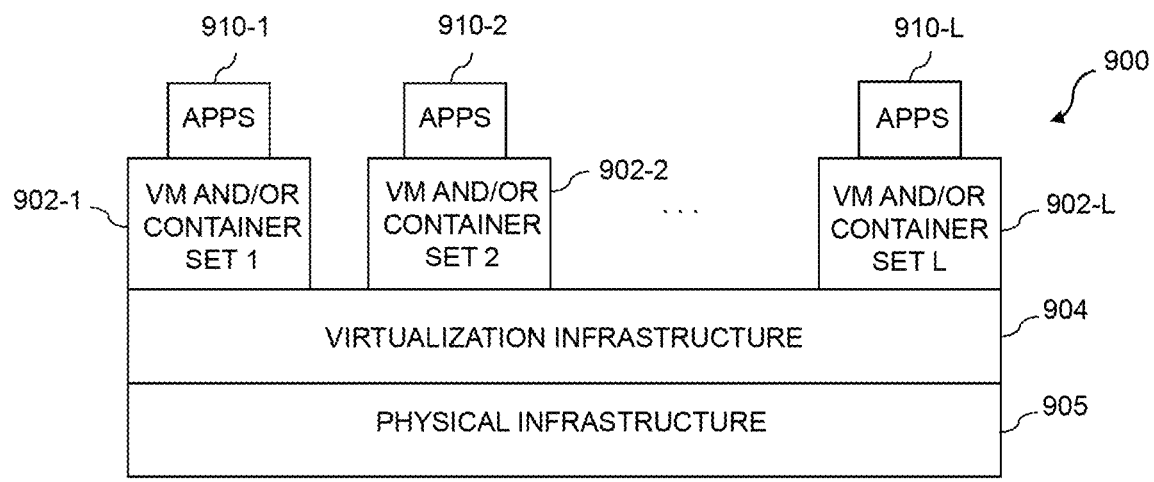
FIGS. 9 and 10 show examples of processing platforms that may be utilized to implement at least a portion of an information processing system in illustrative embodiments.
Figure 10:
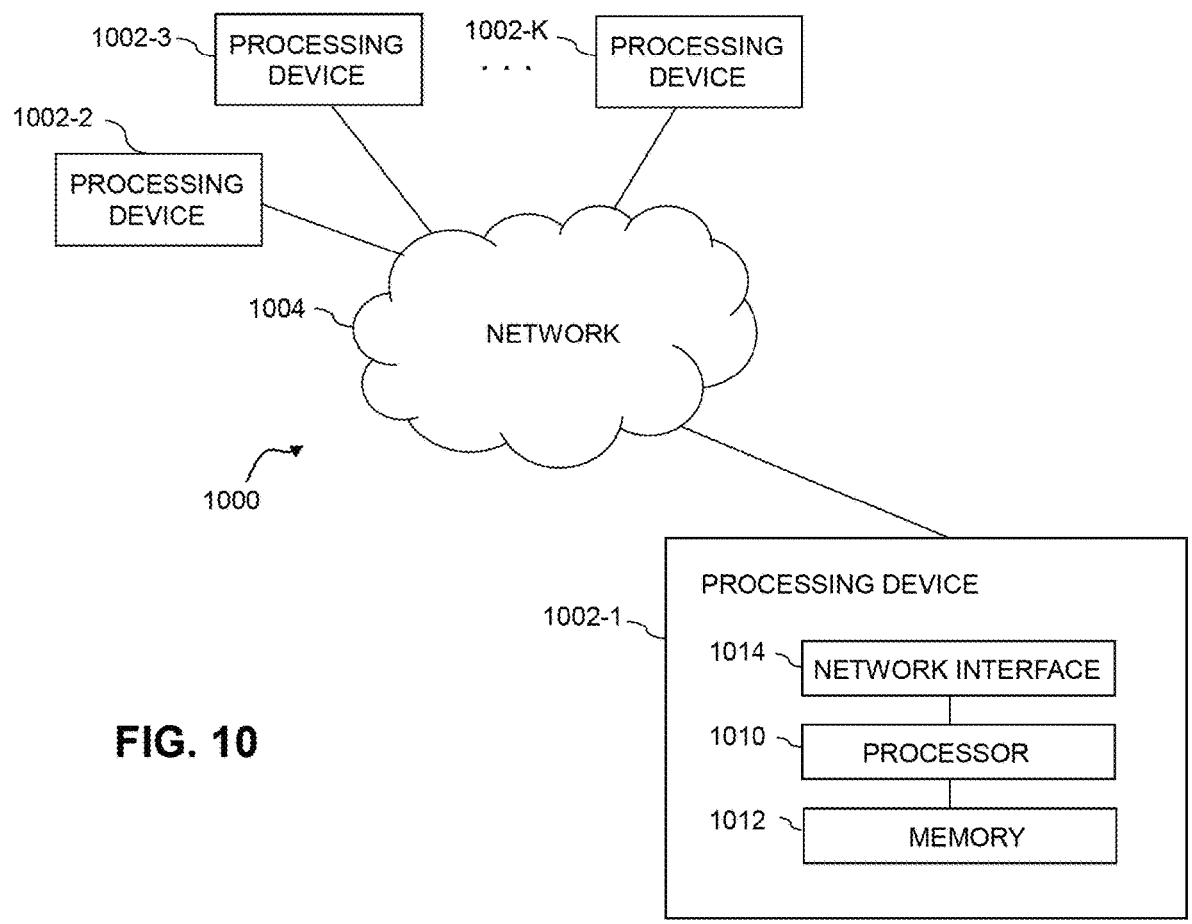

FIG. 9 shows an example processing platform comprising cloud infrastructure 900. The cloud infrastructure 900 comprises a combination of physical and virtual processing resources that may be utilized to implement at least a portion of the information processing system 100. The cloud infrastructure 900 comprises multiple virtual machines (VMs) and/or container sets 902-1, 902-2, . . . 902-L implemented using virtualization infrastructure 904. The virtualization infrastructure 904 runs on physical infrastructure 905, and illustratively comprises one or more hypervisors and/or operating system level virtualization infrastructure. The cloud infrastructure 900 further comprises sets of applications 910-1, 910-2, . . . 910-L running on respective ones of the VMs/container sets 902-1, 902-2, . . . 902-L under the control of the virtualization infrastructure 904. The VMs/container sets 902 may comprise respective VMs, respective sets of one or more containers, or respective sets of one or more containers running in VMs.

In some implementations of the FIG. 9 embodiment, the VMs/container sets 902 comprise respective VMs implemented using virtualization infrastructure 904 that comprises at least one hypervisor. Such implementations can provide shared memory usage tracking of the type described above for multiple processes running on a given one of the VMs. For example, each of the VMs can implement a shared memory usage tracking module such as the module 116 of host device 102-1 for providing shared memory usage tracking functionality for multiple processes running on that particular VM.

An example of a hypervisor platform that may be used to implement a hypervisor within the virtualization infrastructure 904 is the VMware® vSphere® which may have an associated virtual infrastructure management system such as the VMware® vCenter™. The underlying physical machines may comprise one or more distributed processing platforms that include one or more storage systems.

In other implementations of the FIG. 9 embodiment, the VMs/container sets 902 comprise respective containers implemented using virtualization infrastructure 904 that provides operating system level virtualization functionality, such as support for Docker containers running on bare metal hosts, or Docker containers running on VMs. Such implementations can provide shared memory usage tracking of the type described above for multiple processes running on different ones of the containers. For example, a container host device supporting multiple containers of one or more container sets can implement a shared memory usage tracking module such as the module 116 of host device 102-1 for providing shared memory usage tracking functionality for the multiple containers.

As is apparent from the above, one or more of the processing modules or other components of system 100 may each run on a computer, server, storage device or other processing platform element. A given such element may be viewed as an example of what is more generally referred to herein as a "processing device." The cloud infrastructure 900 shown in FIG. 9 may represent at least a portion of one processing platform. Another example of such a processing platform is processing platform 1000 shown in FIG. 10.

The processing platform 1000 in this embodiment comprises a portion of system 100 and includes a plurality of processing devices, denoted 1002-1, 1002-2, 1002-3, . . . 1002-K, which communicate with one another over a network 1004.

The network 1004 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1002-1 in the processing platform 1000 comprises a processor 1010 coupled to a memory 1012.

The processor 1010 may comprise a microprocessor, a microcontroller, an application-specific integrated circuit (ASIC), a field-programmable gate array (FPGA) or other type of processing circuitry, as well as portions or combinations of such circuitry elements.

The memory 1012 may comprise random access memory (RAM), read-only memory (ROM) or other types of memory, in any combination. The memory 1012 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1002-1 is network interface circuitry 1014, which is used to interface the processing device with the network 1004 and other system components, and may comprise conventional transceivers.

The other processing devices 1002 of the processing platform 1000 are assumed to be configured in a manner similar to that shown for processing device 1002-1 in the figure.

Again, the particular processing platform 1000 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure from VCE, the Virtual Computing Environment Company, now the Converged Platform and Solutions Division of Dell EMC.

These and numerous other alternative cloud computing environments can be configured to implement functionality for shared memory usage tracking across multiple processes as disclosed herein.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

As indicated previously, components of an information processing system as disclosed herein can be implemented at least in part in the form of one or more software programs stored in memory and executed by a processor of a processing device. For example, at least portions of the functionality of container groups and associated data services are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, host devices, processes, containers, shared memories, memory management units, shared memory usage tracking modules, and other components. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
a host device comprising at least one processor and an associated memory;
the host device being configured to implement a plurality of processes each configured to access a shared region of the memory;
the host device being further configured:
to establish a multi-process control group for the shared region;
to maintain state information for the multi-process control group; and
to track usage of the shared region by the processes based at least in part on the state information;
wherein the state information maintained for the multi-process control group comprises a current state selected from a plurality of possible states including at least the following states;
a first state indicating that usage of the shared memory region has been properly assessed to respective ones of the processes and that no update to the usage tracking is needed; and
a second state indicating that there has been at least one change necessitating an update to the usage tracking.

2. The apparatus of claim 1 wherein at least a subset of the processes comprise respective containers implemented utilizing operating system level virtualization of the processor of the host device.

3. The apparatus of claim 1 wherein the multi-process control group established for the shared region comprises a coarse-grained control group having a granularity greater than a single page of the shared region.

4. The apparatus of claim 1 wherein the host device is further configured to establish single-process control groups for respective ones of the processes with each such single-process control group being a fine-grained control group having a granularity equivalent to a single page of the shared region.

5. The apparatus of claim 1 wherein the multi-process control group specifies a plurality of characteristics of the shared region including one or more of the following:
an allocated size of the shared region;
a current paged-in size of the shared region;
a current number of processes accessing the shared region; and
a plurality of pointers to respective single-process control groups for the processes accessing the shared region.

6. The apparatus of claim 5 wherein the usage tracking comprises assessing usage of the shared region to each of the processes at least in part as a function of the current paged-in size divided by the current number of processes accessing the shared region.

7. The apparatus of claim 1 wherein said at least one change necessitating an update to the usage tracking comprises one or more of:
an addition of a new process to the processes accessing the shared region;
a deletion of an existing process from the processes accessing the shared region; and
another type of change in at least one characteristic of the shared region.

8. The apparatus of claim 7 wherein another type of change in at least one characteristic of the shared region comprises one or more of:
an addition of a new page to a plurality of pages of the shared region; and
a deletion of an existing page from the plurality of pages of the shared region.

9. The apparatus of claim 1 wherein the plurality of possible states further comprises at least one of the following states:
a third state indicating that an update to the usage tracking is in progress; and
a fourth state indicating that an immediate update to the usage tracking is needed.

10. The apparatus of claim 1 wherein the usage tracking comprises assessing usage of the shared region substantially equally to each of the processes accessing the shared region.

11. The apparatus of claim 1 wherein the usage tracking comprises assessing usage of the shared region to the processes in accordance with actual usage of the shared region by the processes.

12. The apparatus of claim 1 wherein the usage tracking is implemented as a background thread executing on the processor of the host device.

13. The apparatus of claim 1 wherein the usage tracking is configured:
to determine whether or not the multi-process control group is in the second state;
responsive to an affirmative determination that the multi-process control group is in the second state:
to calculate new assessments of usage of the shared region for respective ones of the processes;
to provide the new assessments to respective single-process control groups of the respective processes; and
to change the state of the multi-process control group from the second state to the first state.

14. A method comprising:
configuring a host device comprising at least one processor and an associated memory to implement a plurality of processes each configured to access a shared region of the memory;
establishing a multi-process control group for the shared region;
maintaining state information for the multi-process control group; and
tracking usage of the shared region by the processes based at least in part on the state information;
wherein the state information maintained for the multi-process control group comprises a current state selected from a plurality of possible states including at least the following states:
a first state indicating that usage of the shared memory region has been properly assessed to respective ones of the processes and that no update to the usage tracking is needed; and
a second state indicating that there has been at least one change necessitating an update to the usage tracking; and
wherein the establishing, maintaining and tracking are performed by the host device.

15. The method of claim 14 wherein at least a subset of the processes comprise respective containers implemented utilizing operating system level virtualization of the processor of the host device.

16. The method of claim 14 wherein the multi-process control group established for the shared region comprises a coarse-grained control group having a granularity greater than a single page of the shared region.

17. A computer program product comprising a non-transitory processor-readable storage medium having stored therein program code of one or more software programs, wherein the program code when executed by a host device comprising at least one processor and an associated memory causes the host device:
  to implement a plurality of processes each configured to access a shared region of the memory;
  to establish a multi-process control group for the shared region;
  to maintain state information for the multi-process control group; and
  to track usage of the shared region by the processes based at least in part on the state information;
  wherein the state information maintained for the multi-process control group comprises a current state selected from a plurality of possible states including at least the following states:
  a first state indicating that usage of the shared memory region has been properly assessed to respective ones of the processes and that no update to the usage tracking is needed; and
  a second state indicating that there has been at least one change necessitating an update to the usage tracking.

18. The computer program product of claim 17 wherein at least a subset of the processes comprise respective containers implemented utilizing operating system level virtualization of the processor of the host device.

19. The computer program product of claim 17 wherein the multi-process control group established for the shared region comprises a coarse-grained control group having a granularity greater than a single page of the shared region.

20. The computer program product of claim 17 wherein the program code when executed by the host device further causes the host device to establish single-process control groups for respective ones of the processes with each such single-process control group being a fine-grained control group having a granularity equivalent to a single page of the shared region.

* * * * *